Figures 1, 2:
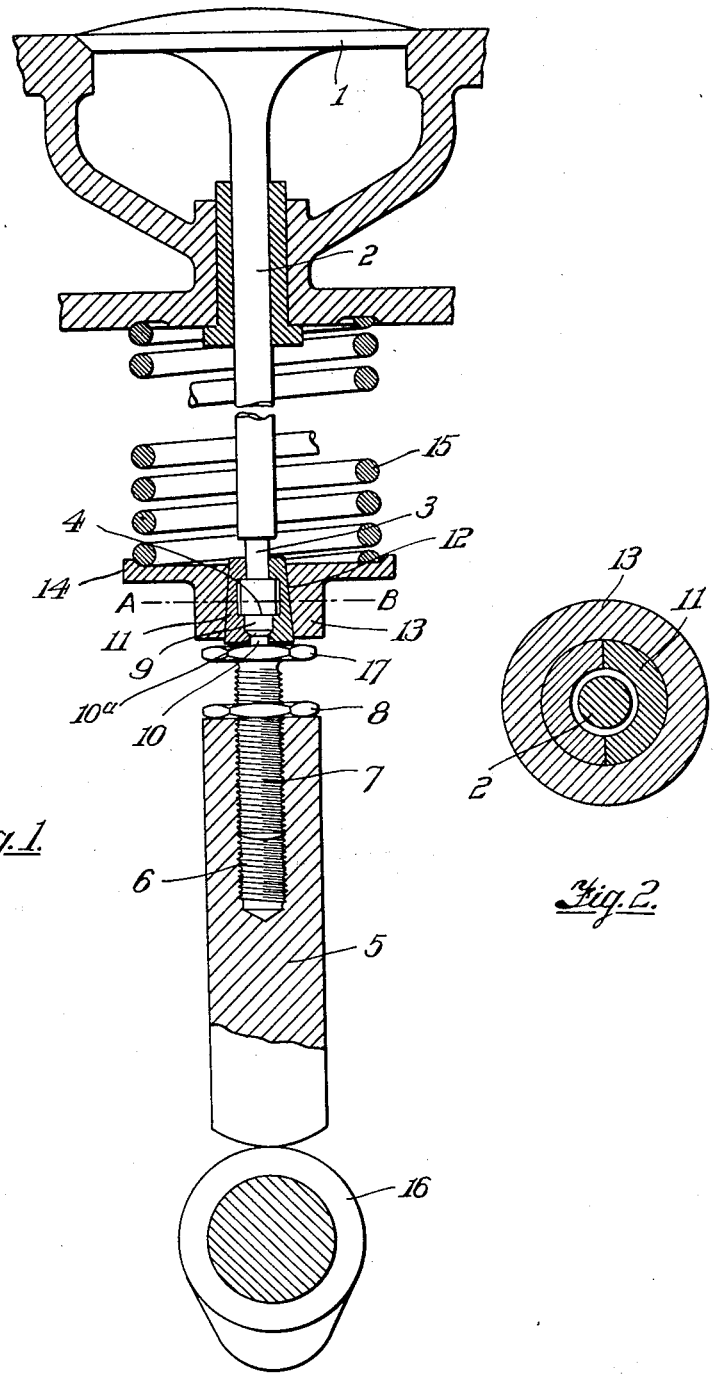

March 6, 1934.  A. B. BUCKLEY  1,950,222
VALVE GEAR
Filed Nov. 29, 1932

INVENTOR
Arthur B. Buckley
By
ATTORNEY

Patented Mar. 6, 1934

1,950,222

UNITED STATES PATENT OFFICE 1,950,222

VALVE GEAR

Arthur Burton Buckley, Carshalton, England

Application November 29, 1932, Serial No. 644,906
In Great Britain November 2, 1932

9 Claims. (Cl. 123—90)

This invention relates to tappet valve gear for internal combustion and kindred types of engine, and its object is to provide means for keeping the tappet head on the cam follower in contact with the valve stem whilst allowing both these parts to rotate or have relative angular movement.

According to the invention, necked portions are formed adjacent to terminal ends of the tappet head and the valve stem and fitting thereover is a split collar or bush having externally and internally tapering sections which in turn is held within a correspondingly tapered boss in the spring cup employed to support the valve spring, the tappet head being fitted with an adjustment device for increasing or decreasing the combined lengths of the part for adjustment and taking up wear.

In carrying this invention into effect and in the preferred manner reference is made to the accompanying drawing in which Fig. 1 represents a part vertical section of the parts constituting the invention and Fig. 2 is a section on line A—B of Fig. 1. Referring to the drawing, 1 is the valve having a stem 2, which is necked at the point 3 adjacent to terminal end 4 of the stem 2. The cam follower 5 is threaded internally as at 6, and receives the correspondingly threaded adjustment stud 7 adapted to be locked in position by nut 8. The threaded stud 7 terminates in a hexagon head 17 which is in turn surmounted by and is integral with a tappet head 9 which is also necked at 10 in a corresponding manner to that of the valve stem 3 but has a tapered upper portion 10a to correspond with the internal tapered portion of split collar or bush 11 disposed around this necked portion (see Fig. 2). The exterior of said bush 11 is tapered and seated within a tapered recess 12 formed in a boss 13 of a spring cup 14. The spring cup 14 supports a spring 15 which compels the return of the valve to its closed position after being lifted by the cam 16 operating on the cam follower 5. The hexagon head 17 on the threaded stud 7 adjacent to the tappet head is necessary as an adjusting device and the lock nut 8 is necessary as a security device.

The operation of the invention is as follows:—
Motion from the cam 16 is conveyed to the cam follower 5 in the known manner which motion is conveyed to the valve stem 2, the tappet head and the valve stem being in contact or approximate contact without clearance, or such clearance as to avoid noise or a blow. Thus the motion of the cam is directly communicated to the valve, the spring 15 assisting the descent of the valve to its closed position. During this motion the collar or bush 11 tends to wedge into the tapered recess in the boss 13 of the spring cup 14, and the internal taper of the bush 11 wedges the tappet head 9 against the end of the valve stem 3, the same again occurring when the valve tends to close under pressure of the spring 15. The valve stem, however, is sufficiently loose in the collar 11 to allow it to rotate or have angular movement of its own irrespective of any rotation or angular movement of the tappet head and cam follower 5. By reason of the fact that the co-operating parts are in contact, the one with the other, during the whole of the movement noise and chatter are eliminated, and the life of the parts is prolonged whilst silence in running is achieved. To adjust the setting of the valve, the lock nut 8 is slacked and the stud adjusted by means of the hexagon head 17. After the adjustment is made the nut 8 is screwed hard on top of the cam follower 5.

I claim:

1. In a tappet valve mechanism of the type wherein the valve member is reciprocated in one direction through action of a cam follower and is reciprocated in the opposite direction by a compressed spring engaging a cup; a stud carried by and adjustable axially of one of said members and contacting with one end of another of said members, a sectional bush interfitting with said stud and the member with which said stud contacts and connecting said stud and member for unitary reciprocation and for free rotation relatively to each other during operation, and the remainder of said members surrounding and maintaining the bush operative under the action of pressure applied to said remaining member.

2. A tappet valve mechanism according to claim 1 wherein said bush and the member surrounding the same have a tapering fit.

3. In a tappet valve mechanism of the type wherein the valve member is reciprocated in one direction through action of a cam follower and is reciprocated in the opposite direction by a compressed spring; a stud carried by and adjustable axially of one of said members and contacting with one end of another of said members, a sectional bush interfitting with said stud and the member with which said stud contacts and connecting said stud and member for unitary reciprocation and for free rotation relatively to each other during operation, and means to maintain the bush assembled.

4. In a tappet valve mechanism of the type wherein the valve member is reciprocable in one direction through the action of a cam follower axially aligned with the stem of the valve member; means providing for axial adjustment of one of said members coacting with the adjacent ends of said members to maintain them in contact and to permit free rotational movement of one of said members relatively to the other of said members.

5. In a tappet valve mechanism of the type wherein the valve member is reciprocated in one direction through the action of a cam follower axially aligned with the stem of the valve member; means for axially adjusting one member, said members having necks, a bush interfitted with said necks maintaining the adjacent ends of said members in contact and permitting free rotational movement of said members relatively to each other during operation.

6. In a tappet valve mechanism according to claim 5, wherein the bush is sectional, and wherein means are provided for maintaining said bush assembled in operation.

7. In a tappet valve mechanism according to claim 5, wherein the bush is sectional, a cup taper is fitted about the bush and a tappet member on one of the members forms the neck of same which is interfitted with the bush.

8. A mechanism of the class described comprising two aligned members adapted for reciprocation, an adjustable stud screw threaded to one of said members having a tappet, the adjacent end of the other member having a neck, and a bush interfitted with said tappet and neck connecting the members for unitary reciprocation and one member for rotation relatively to the other member.

9. A mechanism according to claim 8 wherein said bush is split, and means fitted about the bush to maintain it assembled.

ARTHUR BURTON BUCKLEY.